United States Patent [19]

Wolff

[11] 4,327,460
[45] May 4, 1982

[54] CASTER ASSEMBLY WITH VARIABLE PITCH BEARING

[76] Inventor: John G. Wolff, 42 Taunton Rda, Toronto, Canada, M4S 2P1

[21] Appl. No.: 203,954

[22] Filed: Nov. 4, 1980

[51] Int. Cl.³ .............................................. B60B 33/00
[52] U.S. Cl. .................................... 16/18 A; 16/42 R
[58] Field of Search ................ 16/18 A, 18 R, 45, 46, 16/42

[56] References Cited

U.S. PATENT DOCUMENTS 2,810,151 10/1957 Capham ............................. 16/18 A
4,034,436 7/1977 Ginder ................................ 16/18 A Primary Examiner—Doris L. Troutman

[57] ABSTRACT

A caster assembly is disclosed which includes a bearing block with sockets for interchangeably receiving means of attachment to a frame or other structure. A track member is mounted in the bearing block for rotation about an inclined axis extending downwardly at an angle from the vertical direction. Means forming a variable pitch bearing interposed between the track member and bearing block are described, and its optimum configuration for converting multi-directional forces into radially directed forces distributed more or less evenly around the axis.

10 Claims, 5 Drawing Figures

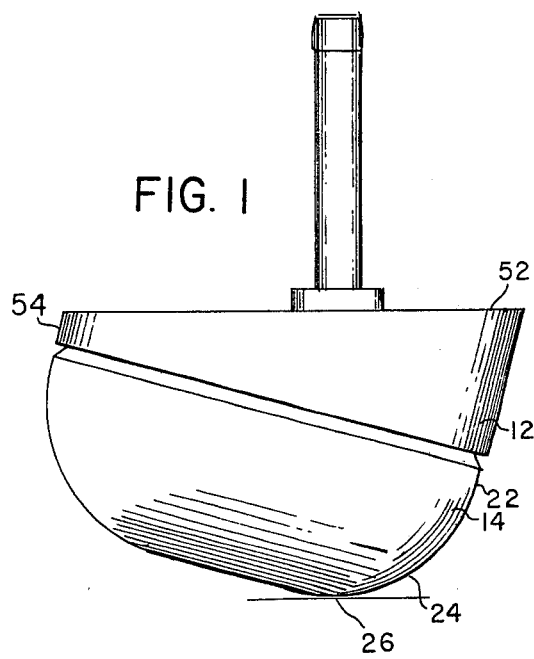
FIG. 1
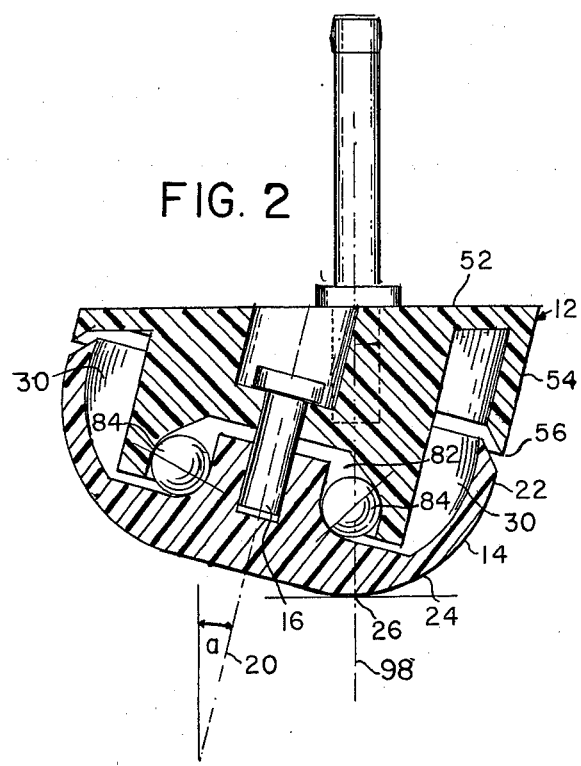
FIG. 2
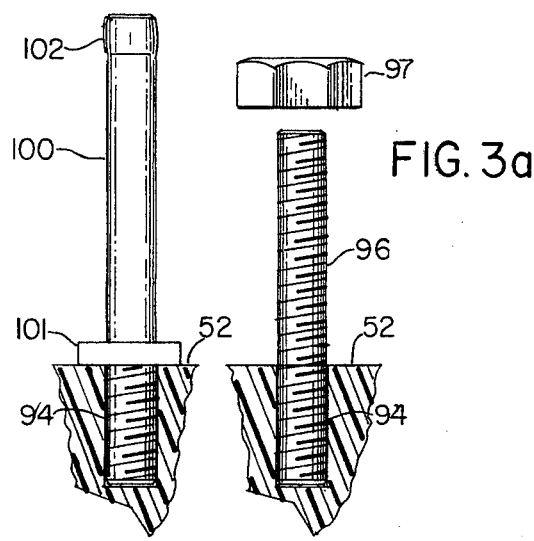
FIG. 3a
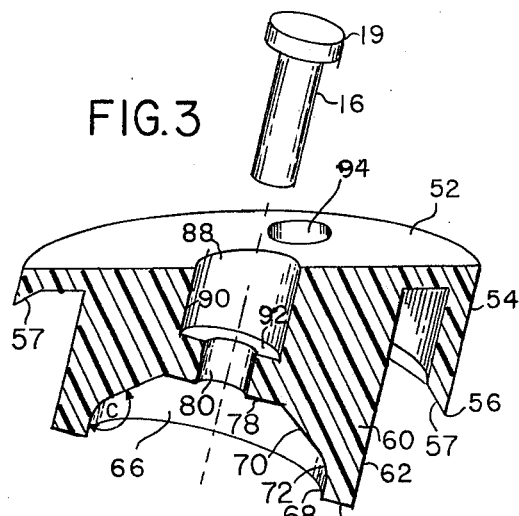
FIG. 3
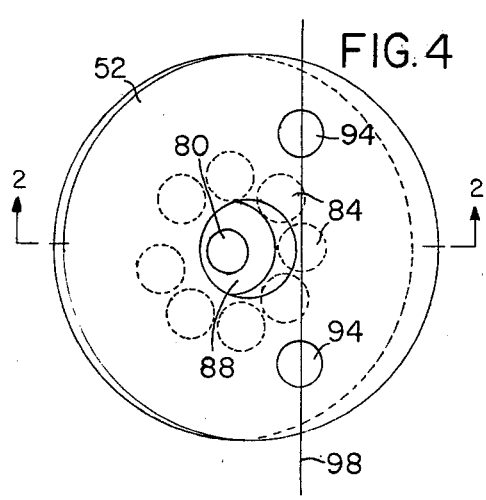
FIG. 4
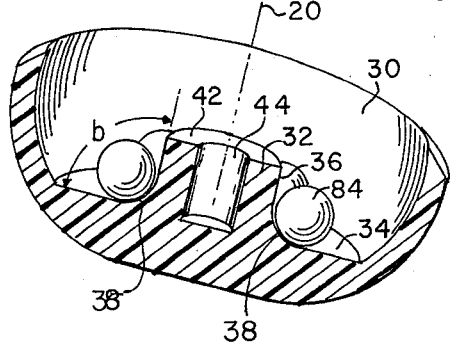

CASTER ASSEMBLY WITH VARIABLE PITCH BEARING

BACKGROUND OF THE INVENTION

The present invention relates in general to caster assemblies which employ a self-laying track member mounted in a bearing block for rotation about an inclined axis. Several devices of this type have previously been provided. U.S. Pat. No. 4,034,436 discloses a caster composed of a bearing block, a caster roller mounted in the bearing block for rotation about a horizontal axis, and a track member journaled in the bearing block for rotation about an inclined axis. The patents to Laugham (U.S. Pat. No. 2,810,151 and No. 3,928,888) show a caster employing a dished disk journaled in a bearing block on an inclined axis, the dished disk being provided with an inner track on which a wheel or roller rolls, while the outer surface of the inclined disk contacts the ground. It is pointed out that such devices are advantageous in facilitating the movement of a frame or other structure over carpeted and rough surfaces, due to the inclination of the track member producing a relatively large 'footprint' in the surface on which it moves.

While investigations have focused primarily on the problems of the basic geometry of the caster, including the angle of inclination of the track member and the location of the swivel stem for optimum tracking ability, these problems and others have generally been inadequately dealt with. U.S. Pat. No. 392,888 for example, shows the location of the swivel stem within a range of positions which would cause the caster to drag rather than to roll over a smooth surface. In addition, such devices fail to deal adequately with the problem of stress in the track member and other components created during normal operation of the caster. It is to be pointed out that in such devices, the arrangement of the track member, caster roller, and bearing block is designed to support a load bearing generally on a single point on the track member and along a vertical line passing through the bearing point. In fact, in any but ideal conditions, the actual forces acting on the caster during normal operation are multi-directional. Particularly in applications where movement is required on rough or uneven surfaces, excessive stress would be placed on the track member and the spindle, causing misalignment of the axis of rotation, and rubbing of the edges of the track member and bearing block. In extreme situations, such stresses will cause premature failure of the caster.

The present invention is directed to overcoming the problems of stress produced by multi-directional forces acting on the caster during normal operation, and particularly such stress as produced when the caster moves on surfaces containing cracks, expansion joints, door sills, the edges of carpets, and other surface irregularities such as are commonly found in many industrial, institutional, and domestic settings.

SUMMARY OF THIS INVENTION

The present invention comprises in summary a bearing block, a track member rotatably mounted in the bearing block on an inclined axis, provided with a circular edge formed concentrically with the axis, and a curved outer surface which contacts the ground. An upwardly open annular cavity is formed in the track member, and a corresponding downwardly open circular cavity is formed in the bearing block, which two parts, when in a normally assembled form, combine to produce an annular wedge-shaped chamber disposed to lie in a plane perpendicular to the axis of rotation of the track member. A circular row of spherical balls is contained in the lower portion of the wedge-shaped chamber, in frictional contact with the opposing walls of the two parts of the chamber. The opposing walls of the wedge-shaped chamber are configured in an optimal form adapted for converting the generally vertical forces acting on the caster into radially directed forces, and for distributing these forces more or less uniformly around the axis of rotation. A pair of stem sockets are provided in the bearing block adapted for interchangeably mounting the caster on a swivel stem for tracking capability, or on a pair of threaded studs for linear motion.

The object of the present invention is to provide an improved caster assembly of the type described including a variable pitch bearing adapted to vary its pitch radially around the axis of rotation to produce a more or less uniform distribution of forces acting on the caster.

A further object is to define the precise configuration and geometric relationships which must exist in a variable pitch bearing of the type described and to permit a caster assembly which includes such a bearing to be used successfully in various applications on irregular surfaces and other situations conducive to stress.

A further object is to define the precise location of the stem axis and to provide multiple sockets in the bearing block adapted to accept various fastening means including a stem assembly for tracking movement by the caster, and a pair of studs whereby the caster may be rigidly attached to a structure for linear motion.

The foregoing and additional features will become apparent from the following description and accompanying drawings, in which like numerals refer to like parts. It will be understood that all designations of direction, such as 'upwardly', 'downwardly', 'upper', 'lower', etc. refer to the drawings, and not specifically to the caster assembly in practice.

BRIEF DESCRIPTION OF THE DRAWINGS

FIG. 1 is a side elevational view of the caster of this invention.

FIG. 2 is a cross-sectional view taken along the line 2—2 of FIG. 4.

FIG. 3 is an exploded cross-sectional view along the line 2—2 of FIG. 4.

FIG. 3a is a fragmentary view of two alternate means of attachment, showing a swivel stem and a threaded stud, FIG. 4 is a top plan view of the caster assembly.

DESCRIPTION OF THE PREFERRED EMBODIMENT

In the drawings, viewing FIG. 1 through FIG. 3, it will be observed that the caster assembly of this invention includes a bearing block 12, and a track member 14, mounted on the bearing block on a spindle 16, for rotation about an inclined axis 20, passing downwardly at an angle 'a' in the range of 10° to 35° from the vertical direction.

The track member 14 is integrally formed of a suitable rigid and durable material, such as nylon, and with a circular edge 22 concentrically formed with the axis 20. The outer surface of the track member is curved near the edge 22, to provide a bearing surface 24 adapted to contact the ground. The inner surface of the track member is formed with an upwardly open, annular cavity or trough 30, which surrounds a cylindrical column 32 projecting upwardly from the floor 34 of the cavity 30, and having its circular side wall 36 formed concentrically with the axis 20 and generally parallel therewith. The portion of the side wall 36 near the base of the column 32 is configured to curve outwardly from the side wall 36 and to merge with the floor 34 of the cavity 30 in a plane which lies perpendicular to the axis 20. The curved section so formed provides a circular bearing surface 38, whose contact area, defined by the angle 'b' is on the order of 90° and opening in a generally upwardly direction at an angle on the order of 45° from the axis 20. The upper end of the column 32 is truncated to form an end wall 42 which lies in a plane perpendicular to the axis 20. An upwardly open circular bore is formed in the end wall 42, coaxially with the axis 20, and adapted to receive the spindle 16, which may be press-fitted therein.

The bearing block 12 is integrally formed of a rigid and durable material, such as nylon, with an upper end wall 52 disposed in a generally horizontal plane. A cylindrical side wall 54 is formed around the edge of the end wall 52, having a radius commensurate with that of the edge 22 of the track member 14. The side wall 54 projects downwardly from the end wall 52, and is truncated at the lower end to form a circular edge 56 which lies in a plane perpendicular to the axis 20. A cylindrical column 60 is formed in the bearing block 12, having a circular side wall 62 projecting downwardly from the end wall 52 at an inclined angle equal to the angle 'a', and having an outer diameter of a suitable order of magnitude to permit the column 60 to be contained within the cavity 30 in the track member 14. The column 60 extends downwardly beyond the circular edge 56 of the outer side wall 54, and is truncated to form an end wall 64 which lies in a plane perpendicular to the axis 20. A downwardly open circular cavity 66 is formed in the end wall 64 concentrically with the axis 20 and having a diameter of a suitable order of magnitude to permit the column 32 on the track member 14 to be contained therein, as will hereinafter be explained. The interior wall of the circular cavity 66 is suitably configured to include a lower section 68 formed generally parallel with the axis 20, an upper section with a circular side wall 70 which tapers inwardly at an angle 'c' in the range of 90° to 145° from the direction of the side wall 68. A middle section is configured to form a curved circular bearing surface 72 which merges with the adjacent side walls 68 and 70,. The bearing surface 72 has a curvature defined by the angle 'c', opening in a generally downwardly direction. An upper end wall 78 is formed at the upper end of side wall 70, and is disposed to lie in a plane perpendicular to the axis 20. A circular bore 80 is formed in the end wall 78, concentrically with the axis 20, and adapted to receive the spindle 16 for rotation therein.

FIG. 2 shows the interior of the caster in its assembled condition. The column 32 in the track member 14 projects into the cavity 66 to form an annular wedge-shaped chamber 82 between the stationary walls 68, 70, 72 of the chamber 66, and the rotatable element including the walls 34, 36, 38 in the cavity 30. A curved trough is formed in the lower portion of the wedge-shaped chamber 82, partially enclosed by the curved bearing surfaces 38 and 82. A circular row of spherical balls 84 is contained in the trough in frictional contact with the opposing bearing surfaces 38 and 72, such that the angle of contact, or pitch, is upwardly inclined at an optimum angle in the range of 10° to 90° from the direction of the axis 20. The spherical balls 84 have a diameter of a suitable magnitude, such as to permit the track member to rotate freely and yet without undue free play or lateral wobble.

In operation, the track member 14 rotates on the inclined axis 20, contacting the ground at point 26 on the curved bearing surface 24. The load placed on the caster creates a generally vertically directed force along the vertical plane 98 which passes through the cavity 66 and intersects the ground contact point 26. This vertically directed force impinges on the spherical balls 84 lying in the portion of the wedge-shaped chamber 82 nearest the plane 98, urging them upward against the wall 70 in the chamber. It is thus upwardly directed force by the balls 84 against the inclined wall 70, of course, which converts the vertical forces along the plane 98 into radially directed forces, and distributes them around the axis 20, as will hereinafter be explained. It will be noted that during normal operation of the caster, the pitch, or angle at which the balls 84 contact the opposing bearing surfaces 38 and 72, respectively, varies radially around the axis 20 as a joint function of the angles 'a', 'b' and 'c'. This variation in the pitch is thought to provide the means for distributing the vertically directed forces along the plane 98, more or less uniformly around the axis 20, and consequently reducing the stress induced in any single point in the caster. At present, it is considered that the angle 'c', or the slope of the inclined wall 70, is the main factor which determines how the forces are distributed around the axis 20. In general, as the angle 'c' approaches 90°, the pitch approaches 0°, and almost none of the vertical force along the vertical plane 98 is deflected laterally against the outlying portion of the chamber 82. On the other hand, as the angle 'c' approaches 180°, the vertical force will cause the spherical balls 84 to become stuck in the wedge-shaped chamber 82, instead of rolling smoothly around the chamber. A proper compromise between these two extremes is an angle 'c' which will provide a more or less uniform distribution of forces around the axis 20, without adversely affecting the operating effectiveness of the caster. It is at present considered that an angle 'c' in the range of 105° to 135° is optimal for providing smooth rotation of the track member 14 and an optimum distribution of forces around the axis 20 under most types of operating conditions.

The upper end wall 52 on the bearing block 12 is provided with an upwardly open cavity 88 having a circular side wall 90 formed concentrically with the axis 20, and a floor 92 which lies perpendicular to the axis 20. The bore 80 opens outwardly into the cavity 88 through the floor 92 thereof. The spindle 16 is rotatably mounted in the bore 80, and having its lower end adapted to be rigidly fitted into the bore 44 in the track member 14. The upper end of the spindle 16 is provided with a head 19, which is adapted to be contained in the cavity 88, and having a diameter of a suitable magnitude in order to prevent removal of the spindle downwardly through the bore 80.

The track member 14 is formed with a bevelled edge 23 which inclines upwardly from the outer edge 22. A corresponding downwardly inclined edge 57 is formed adjacent to the edge 56 on the bearing block 12, and adapted to conform closely with the angle of inclination of the edge 23 on the track member, serving as a means of protectively enclosing the interior of the caster in an attractive cover, without unduly restricting any normal free play of the track member.

The upper end wall 52 on the bearing block 12 is provided with a pair of spaced-apart circular bores 94 formed vertically therein, their longitudinal axis coinciding with the vertical plane 98, as shown in FIG. 4. The bores 94 may be equipped with internal threads adapted to interchangeably accept various means of attachment to a structure, as illustrated in FIG. 3a. Thus, for example, a stem 100 may be provided, having a threaded lower end adapted to be secured in either one of the bores 94, and an upper protion adapted to be inserted into a conventional socket for rotation about a vertical axis. Alternatively, a pair of threaded studs may be inserted into the bores 94, and their distal ends then secured on a structure by means of nuts 97.

The caster is assembled in the following manner: A number of spherical balls 84 are placed into the annular cavity 30 in the track member 14, forming a circular row of balls in the bearing surface 36. The track member is then mounted on the bearing block 12, so that the cylindrical column 32, together with the circular row of spherical balls 84 are inserted into the cavity 66 on the bearing block 12, until the balls come into frictional contact with the opposing bearing surfaces 36 and 72 on the track member and bearing block respectively. The spindle 16 is inserted downwardly through the bore 92 and pressed into the bore 44 in the track member, until the head 19 is in close proximity to the floor 90 in the cavity 88, leaving sufficient clearance to permit the track member to rotate freely. The caster is operated by attaching the bearing block to a structure as previously described, and then by placing the curved bearing surface 24 into contact with the ground or other surface for movement thereon.

What is claimed is:

1. A caster assembly comprising the combination of a bearing block, a track member mounted for rotation on said bearing block about an inclined axis extending downwardly at an angle 'a' in the range of 10° to 35° from a vertical direction, said track member including a cupped outer surface adapted for contacting the floor or other surface for movement thereon, means forming an annular cavity in said track member opening outwardly in the end opposite said cupped outer surface and disposed to lie in a plane perpendicular to said axis and concentrically therewith, means forming a corresponding circular cavity opening outwardly in one end of said bearing block, said two cavities being combined in a cooperating configuration to form two parts of an annular chamber, in which said circular cavity is a stationary element, and in which said annular cavity is a moveable element, said annular chamber containing a circular row of spherical balls in frictional contact with said elements.

2. A caster assembly as in claim 1, in which said track member is provided with means forming an annular cavity opening outwardly in the side opposite said cupped outer surface, said annular cavity having a portion of its surface configured to form a bearing surface which curves outwardly in an arc 'b' in the range of 0° to 90° from the direction of said axis, and in which said bearing block is provided with means forming a circular cavity opening outwardly in one end thereof, said circular cavity having a portion of its side wall configured to form a second bearing surface which curves inwardly in an arc 'c' in the range of 0° to 145° from the direction of said axis, said bearing surfaces being disposed in a cooperating configuration to each other, and enclosing a circular row of spherical balls between said bearing surfaces and in frictional contact therewith, and in a pitch which is inclined upwardly at an angle in the range of 0° to 90° from the direction of said axis.

3. A caster assembly as in claim 2, further comprising an inclined circular wall formed with the side wall of said circular cavity in said bearing block, said inclined circular wall being disposed about said axis and inclined downwardly therefrom at an angle in the range of 45° to 90° said inclined wall being configured to curve inwardly near the lower end of said circular cavity and to merge with said second bearing surface, whereby the combination of said inclined circular wall and adjoining circular bearing surface form an enlarged bearing surface defined by the angle 'c' in the range of 0° to 145° from said axis.

4. A caster assembly as in claim 2, in which said track member is equipped with means forming an annular cavity opening outwardly in the side opposite said cupped outer surface, said annular cavity having a portion of the surface therein configured to curve outwardly in a concave arc 'b' in the range of 0° to 90° from the direction of said axis, and in which said bearing block is equipped with means forming a circular cavity opening outwardly in one end thereof, and concentrically with said axis, having a portion of the side wall of said cavity inclined outwardly from said axis in the range of 45° to 90° said inclined wall being configured to curve inwardly near the outer end of said circular cavity to a maximum angle generally parallel with said axis, to form an arc 'c' in the range of 0° to 145° from the direction of said axis, such that the assembled combination of said circular bearing surfaces defined by the arcs 'b' and 'c' form a moveable element and a stationary element respectively, in an annular chamber having a generally wedge-shaped configuration at the upper end thereof when viewed in cross-section, and a generally semi-circular configuration at the lower end thereof when viewed in cross-section, said annular chamber containing a circular row of spherical balls in the lower portion thereof, and in frictional contact with said moveable and stationary elements, in a pitch which is radially variable in a range of 0° to 90° from the direction of said axis.

5. A caster assembly as in claim 4, in which the lower portion of the wedge-shaped chamber includes a chamber having a generally semi-circular shape when viewed in cross-section, and partially enclosed at the lower end thereof and opening at the upper end thereof into said wedge-shaped chamber, the outer wall thereof being inclined from the inner wall thereof at an angle on the order of 45°, said outer and inner walls being in frictional contact with said circular row of spherical balls in a pitch which is generally upwardly directed into said wedge-shaped chamber.

6. A caster assembly as in claim 2, in which the angle 'a' is on the order of 20°, and the angle 'c' is on the order of 120°.

7. A caster assembly as in claim 2, in which the angle 'c' is on the order of 90°.

8. A caster assembly as in claim 2, in which the angle 'c' is in the range of 110° to 120°.

9. A caster assembly as in claim 1, in which the bearing block is equipped with a stem for rotation about a vertical axis which is laterally spaced from the inclined axis of the track member and lies on a vertical plane which passes through the bearing point located on the cupped outer surface of said track member.

10. The device of claim 1, in which the bearing block is formed with a generally horizontal upper end wall equipped with a pair of spaced-apart sockets, the axes of which are spaced laterally from the inclined axis and disposed to lie on a vertical plane which passes through the bearing point located on the outer surface of the track member, said sockets being adapted to receive means for attaching said device to a structure for movement over a floor or other surface.

* * * * *